(12) United States Patent
Thorstensen-Woll et al.

(10) Patent No.: US 9,815,589 B2
(45) Date of Patent: *Nov. 14, 2017

(54) TABBED SEALING MEMBER WITH IMPROVED HEAT DISTRIBUTION FOR A CONTAINER

(71) Applicant: Selig Sealing Products, Inc., Forrest, IL (US)

(72) Inventors: Robert William Thorstensen-Woll, Barrie (CA); Joseph Smelko, Cornwall (CA)

(73) Assignee: Selig Sealing Products, Inc., Forrest, IL (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/809,771

(22) Filed: Jul. 27, 2015

(65) Prior Publication Data

US 2016/0185485 A1 Jun. 30, 2016

Related U.S. Application Data

(63) Continuation of application No. 14/226,932, filed on Mar. 27, 2014, now Pat. No. 9,102,438, which is a continuation of application No. 13/296,016, filed on Nov. 14, 2011, now Pat. No. 8,715,825, which is a continuation-in-part of application No. 11/030,275, filed on Jan. 6, 2005, now Pat. No. 8,057,896.

(51) Int. Cl.
*B32B 7/12* (2006.01)
*B65D 17/00* (2006.01)
*B65D 77/20* (2006.01)

(52) U.S. Cl.
CPC ....... *B65D 17/163* (2013.01); *B65D 77/2032* (2013.01); *B32B 2307/304* (2013.01); *B32B 2435/02* (2013.01); *B65D 2577/205* (2013.01); *Y10T 428/24843* (2015.01); *Y10T 428/249983* (2015.04); *Y10T 428/264* (2015.01); *Y10T 428/28* (2015.01); *Y10T 428/2804* (2015.01); *Y10T 428/2813* (2015.01); *Y10T 428/2817* (2015.01); *Y10T 428/2826* (2015.01); *Y10T 428/2839* (2015.01); *Y10T 428/2848* (2015.01)

(58) Field of Classification Search
CPC .............. B65D 17/163; B65D 77/2032; B32B 2307/304

See application file for complete search history.

(56) References Cited

U.S. PATENT DOCUMENTS

| | | | |
|---|---|---|---|
| 2,768,762 | A | 10/1956 | Eugene |
| 3,235,165 | A | 2/1966 | Jackson |
| 3,292,828 | A | 12/1966 | Stuart |
| 3,302,818 | A | 2/1967 | Balocca et al. |
| 3,460,310 | A | 8/1969 | Adcock et al. |
| 3,990,603 | A | 11/1976 | Brochman |

(Continued)

FOREIGN PATENT DOCUMENTS

| | | | |
|---|---|---|---|
| AT | 501393 | A1 | 8/2006 |
| AT | 11738 | U1 | 4/2011 |

(Continued)

*Primary Examiner* — Victor Chang
(74) *Attorney, Agent, or Firm* — Fitch, Even, Tabin & Flannery, LLP

(57) ABSTRACT

A tabbed seal as well as a method of manufacture is provided for sealing containers such as bottles, jars and the like. The tabbed seal is formed with a lower sheet-like structure having a non-foam, heat-distributing layer thereon.

20 Claims, 5 Drawing Sheets

(56) References Cited

U.S. PATENT DOCUMENTS

| | | |
|---|---|---|
| 4,133,796 A | 1/1979 | Bullman |
| 4,206,165 A | 6/1980 | Dukess |
| 4,582,735 A | 4/1986 | Smith |
| 4,588,099 A | 5/1986 | Diez |
| 4,596,338 A | 6/1986 | Yousif |
| 4,636,273 A | 1/1987 | Wolfersperger |
| 4,666,052 A | 5/1987 | Ou-Yang |
| 4,735,335 A | 4/1988 | Torterotot |
| 4,741,791 A | 5/1988 | Howard |
| 4,770,325 A | 9/1988 | Gordon |
| 4,801,647 A | 1/1989 | Wolfe, Jr. |
| 4,811,856 A | 3/1989 | Fischman |
| 4,837,061 A | 6/1989 | Smits |
| 4,863,061 A | 9/1989 | Moore |
| 4,938,390 A | 7/1990 | Markva |
| 4,960,216 A | 10/1990 | Giles |
| 4,961,986 A | 10/1990 | Galda |
| 5,004,111 A | 4/1991 | McCarthy |
| 5,015,318 A | 5/1991 | Smits |
| 5,055,150 A | 10/1991 | Rosenfeld |
| 5,057,365 A | 10/1991 | Finkelstein |
| 5,071,710 A | 12/1991 | Smits |
| 5,098,495 A | 3/1992 | Smits |
| RE33,893 E | 4/1992 | Elias |
| 5,125,529 A | 6/1992 | Torterotot |
| 5,149,386 A | 9/1992 | Smits |
| 5,178,967 A | 1/1993 | Rosenfeld |
| 5,197,618 A | 3/1993 | Goth |
| 5,265,745 A | 11/1993 | Pereyra |
| 5,433,992 A | 7/1995 | Galda |
| 5,513,781 A | 5/1996 | Ullrich |
| 5,514,442 A | 5/1996 | Galada et al. |
| 5,598,940 A | 2/1997 | Finkelstein |
| 5,601,200 A | 2/1997 | Finkelstein |
| 5,615,789 A | 4/1997 | Finkelstein |
| 5,669,521 A | 9/1997 | Wiening |
| 5,702,015 A | 12/1997 | Giles |
| 5,860,544 A | 1/1999 | Brucker |
| 5,871,112 A | 2/1999 | Giles |
| 5,915,577 A | 6/1999 | Levine |
| 5,975,304 A | 11/1999 | Cain |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,312,776 B1 | 11/2001 | Finkelstein |
| 6,378,715 B1 | 4/2002 | Finkelstein |
| 6,458,302 B1 | 10/2002 | Shifflet |
| 6,548,302 B1 | 4/2003 | Mao |
| 6,602,309 B2 | 8/2003 | Vizulis |
| 6,627,273 B2 | 9/2003 | Wolf |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko |
| 6,902,075 B2 | 6/2005 | OBrien |
| 6,916,516 B1 | 7/2005 | Gerber |
| 6,955,736 B2 | 10/2005 | Rosenberger |
| 6,974,045 B1 | 12/2005 | Trombach |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,740,730 B2 | 6/2010 | Schedl |
| 7,740,927 B2 | 6/2010 | Yousif |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Woll |
| 8,057,896 B2 | 11/2011 | Smelko |
| 8,329,288 B2 | 12/2012 | Allegaert |
| 8,348,082 B2 | 1/2013 | Cain |
| 2002/0068140 A1 | 6/2002 | Finkelstein |
| 2003/0168423 A1 | 9/2003 | Williams |
| 2004/0043238 A1 | 3/2004 | Wuest |
| 2004/0109963 A1 | 6/2004 | Zaggia |
| 2005/0048307 A1 | 3/2005 | Schubert |
| 2005/0208242 A1 | 9/2005 | Smelko |
| 2005/0208244 A1 | 9/2005 | Delmas |
| 2005/0218143 A1 | 10/2005 | Niederer |
| 2006/0000545 A1 | 1/2006 | Nageli |
| 2006/0003120 A1 | 1/2006 | Nageli |
| 2006/0003122 A1 | 1/2006 | Nageli |
| 2006/0151415 A1 | 7/2006 | Smelko |
| 2006/0278665 A1 | 12/2006 | Bennett |
| 2007/0003725 A1 | 1/2007 | Yousif |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0156443 A1 | 7/2008 | Schaefer |
| 2008/0169286 A1 | 7/2008 | McLean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | McLean |
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | OBrien |
| 2010/0213193 A1 | 8/2010 | Helmlinger |
| 2010/0221483 A1 | 9/2010 | Gonzalez Carro |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | McLean |
| 2011/0147353 A1 | 6/2011 | Kornfeld |
| 2012/0000910 A1 | 1/2012 | Ekkert |
| 2012/0043330 A1 | 2/2012 | McLean |
| 2012/0067896 A1 | 3/2012 | Daffner |
| 2012/0103988 A1 | 5/2012 | Wiening |
| 2012/0111758 A1 | 5/2012 | Lo |
| 2012/0241449 A1 | 9/2012 | Frischmann |
| 2013/0020324 A1 | 1/2013 | Thorstensen-Woll |
| 2014/0001185 A1 | 1/2014 | McLean |
| 2014/0061196 A1 | 3/2014 | Thorstensen-Woll |
| 2014/0186589 A1 | 7/2014 | Chang |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| CA | 2203744 | 10/1997 |
| CN | 1301289 A | 6/2001 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0668221 A1 | 8/1995 |
| EP | 0826598 A2 | 3/1998 |

(56) References Cited

FOREIGN PATENT DOCUMENTS

| | | |
|---|---|---|
| EP | 0826599 A2 | 3/1998 |
| EP | 0717710 B1 | 4/1999 |
| EP | 0915026 A1 | 5/1999 |
| EP | 0706473 B1 | 8/1999 |
| EP | 1075921 | 2/2001 |
| EP | 1199253 | 4/2002 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1968020 A1 | 9/2008 |
| EP | 1992476 A1 | 11/2008 |
| EP | 2230190 A1 | 9/2010 |
| EP | 2292524 A1 | 3/2011 |
| FR | 2916157 A1 | 11/2008 |
| FR | 2943322 A1 | 9/2010 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| WO | 9905041 A1 | 2/1999 |
| WO | 0066450 | 11/2000 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |

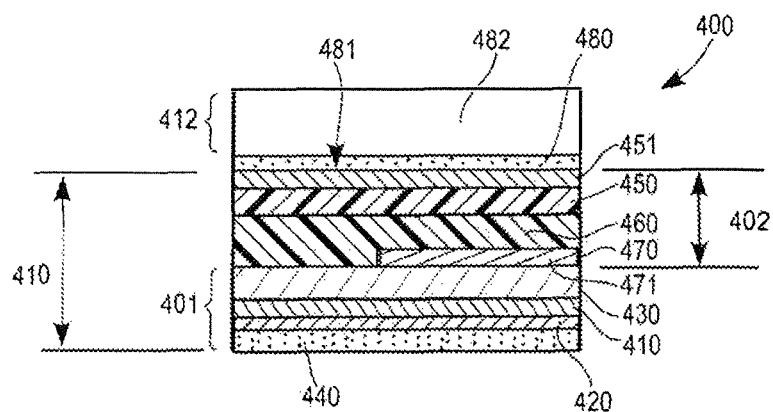
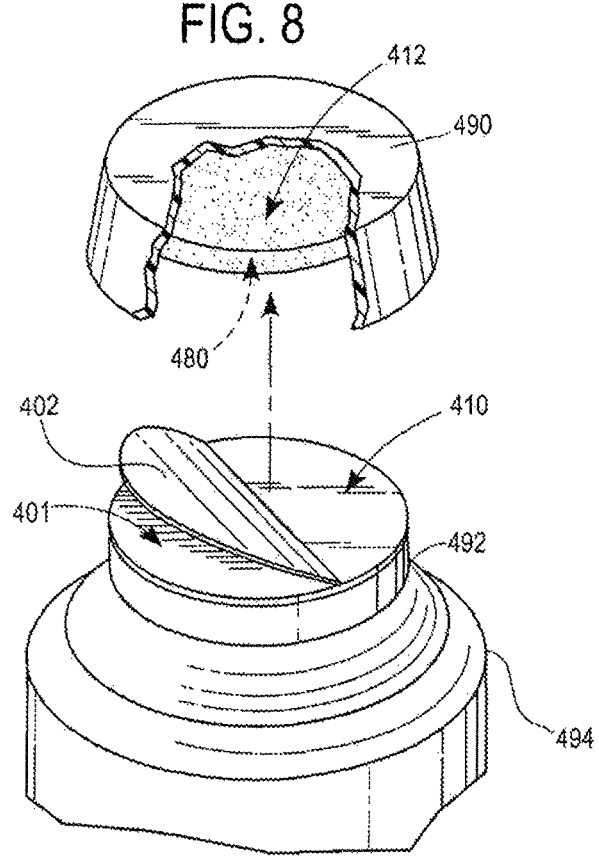

TABBED SEALING MEMBER WITH IMPROVED HEAT DISTRIBUTION FOR A CONTAINER

CROSS-REFERENCE TO RELATED APPLICATIONS

This application is a continuation of prior application Ser. No. 14/226,932, filed Mar. 27, 2014, which is a continuation of prior application Ser. No. 13/296,016, filed Nov. 14, 2011, which is a continuation-in-part of prior application Ser. No. 11/030,275, filed Jan. 6, 2005, all of which are hereby incorporated herein by reference in their entirety.

FIELD

The disclosure relates to a pull-tab sealing member for closing the mouth of a container, and more particularly to a pull-tab sealing member with improved heat distribution during induction sealing to the mouth of a container.

BACKGROUND

It is often desirable to seal a bottle, jar or other container with a closure to maintain freshness of the contents thereof or to indicate whether the container has been tampered with. However, it is also desirable that the closure be easy to remove by the user. For example, U.S. Pat. No. 5,433,992, the contents of which are incorporated herein by reference, describes a top-tabbed closure for a container which has a membrane for sealing the container and a sheet which is bonded to the top of the membrane, in a manner which leaves a tab portion of the sheet free. A user seeking to gain access to the contents of the container simply grips the tab with their fingers and by pulling on the tab, which is connected to the sheet, can remove the entire closure and access the contents of the container in a relatively convenient manner.

Referring generally to FIG. 1, a conventional top-tabbed closure is shown generally at the top of a bottle 10 as container seal 100. A cross sectional view of seal 100, taken along line 2-2 of FIG. 1 which is not drawn to scale, is shown in FIG. 2.

Seal 100 includes a lower section 101, comprising a lower layer 110, which is formed of an adhesive, such as a hot melt adhesive or other sealants, for securing seal 100 to the top of bottle 10. Lower section 101 also includes a foil layer 120 and a polyethylene terephthalate (PET) layer 130 between foil layer 120 and sealant 110. Seal 100 also includes an upper section 102. Upper section 102 includes an ethylene vinyl acetate (EVA) layer 170 having a PET top layer 180 disposed thereon. A bottom surface 150 of EVA layer 170 is surface treated and bonded to foil layer 120. Lower surface 150 also bonds a paper release layer 140 to EVA layer 170. Thus, release layer 140 prevents EVA layer 170 from being completely bonded to foil layer 120 at lower surface 150. Lower surface 150 only bonds EVA layer 170 to foil 120 up to a boundary line 160 so as to permit a tab portion 200 to be graspable. However, this bond between upper section 102 and lower section 101 is strong enough, so that pulling tab portion 200 can remove all of seal 100 in one piece.

Conventional container seals exhibit several problems. For example, a paper release or information layer can be sensitive to exposure to moisture. Use of PET release layers alone do not provide a fully satisfactory seal. Corrosion of foil layers can also present a problem. Also, conventional closures typically require containers to have smooth surfaces to insure proper bonding and release.

One particular problem is uneven heating during heat sealing steps. The uneven heating of the heat-activated adhesive is attributed to the uneven distribution of heat between the tabbed and non-tabbed sides of the seal. As a result, one side of the seal is sufficiently adhered to the mouth of the container while the other side is not. The common solution to this problem has been overheating (i.e., oversealing) the seal to ensure that both sides of the seal are adhered to the container. However, this common solution presents additional problems in that the closures will not separate from the container satisfactorily when the tab is pulled which can result in tearing and unsatisfactorily incomplete removal of the seal from the mouth of the container. Likewise, the use of excessive heat can lead to oozing of the sealing adhesive which in turn can adhere the tab to the seal. This unwanted side effect is sometimes referred in the art as "tab grab" which prevents the end user from having easy access to the tab for removal of the seal from the container.

The shortcomings of the conventional top-tabbed container seals described above are heightened when the seal is combined in a two-piece liner and seal assembly. A two-piece liner and seal assembly typically includes an upper portion of a liner, compressing agent, or pulp board that is bonded by a wax or other material to an upper surface of a lower seal portion. The wax holds the liner portion to the seal portion prior to induction sealing. Upon induction heating, the wax melts and is absorbed by the liner to separate the upper liner portion from the lower seal portion and the lower seal portion is heat sealed to a container rim. Upon a consumer opening a cap or other closure, the liner is retained in the cap while the seal remains bonded to the container rim.

When the conventional top-tabbed seal mentioned above is combined with a wax bonded liner forming a two-piece induction seal, the induction sealing window of operation is considerable smaller than a comparable, but non-tabbed wax bonded liner and seal combination. The problems with uneven heating caused by the partial, paper release layer tend to insulate the wax layer and impede wax absorption over at least a portion of the assembly above the release layer at lower induction settings. Thus, wax may be adequately absorbed on the non-tabbed side of the seal to permit liner separation, but not fully melted and not absorbed on the tabbed side of the seal. This tends to result, in some cases, of a liner that has not properly separated from the seal above the paper release layer. In other cases, if the seal includes a foam layer, the foam tends to trap heat below it which may also result in the wax not being adequately absorbed. A common field solution to these problems is an elevated level of induction heating or a longer induction dwell time, which tends to generate a surplus of heat energy in the assembly. However, elevated heating or longer dwell times has an adverse effect on the performance of the two-piece assembly. For instance, the additional heat further accentuates the performance shortcomings of the tearing, adhesive oozing, and tab grab mentioned above. Moreover, in a two-piece liner and tabbed seal assembly, elevated induction heating and dwell times can often melt the upper polymer layers of the lower seal portion resulting in permanent adhesion or back bonding of the lower tabbed seal portion to the upper liner portion.

SUMMARY

Generally speaking, a seal and method of manufacture is provided for sealing containers such as bottles, jars and the like. The seal (i.e., closure) is formed with a lower sheet-like structure having a non-foam, heat-distributing layer thereon. The lower structure includes a foil support layer and has a polymer layer, such as a PET film thereunder. A heat-activated sealant layer is provided under the bottom surface of the PET layer to bond (i.e., adhere) the seal to the opening of a container. Depending on the container being sealed, the PET film may be coated with a suitable material that will bond to various container types. The non-foam, heat-distributing layer is a preferably polyolefin film layer. Seals herein also include a top portion, which is partially bonded (directly or indirectly) to the bottom portion, so as to leave a tab portion extending from the seal. The top portion is advantageously bonded from periphery to periphery of the bottom portion and at or slightly offset from the diameter (middle) of the bottom portion. The top portion is advantageously formed with polymer material, such as an ethylene vinyl acetate (EVA) layer, having a layer of PET bonded on the top thereof. A release strip, which can have a release layer coated on the bottom thereof can be adhered to the top structures and used to prevent the tab from adhering to the lower structure. The release layer can be formed of PET or silicone release coated PET, paper, nylon or polypropylene.

To form seals described herein, a first laminated sheet of bottom section material is laminated to a sheet of top section material after interposing releasing strips between the sheets. The releasing strips can be bonded to the top section material and can be printed with written material or instructions. The bottom of the releasing strips can be coated with a release promoting substance, so as to prevent the top sheet from bonding to the bottom sheet at the location of the tabbing strips. Seals, such as those in the shape of a disc, can then be die cut from the sheets. Each disc has approximately half of its area in plan view comprising a release strip. The result is a seal with adhesive on a bottom side surface and a gripping tab on the top, bonded to half the seal. Such seals can be bonded to the top of containers to seal the contents thereof. Advantageously, the pull-tab sealing members described herein exhibit an improved distribution of heat to the heat-activated adhesive resulting in improved adherence of the sealing member to the container.

Another form of the seal and method of manufacture is provided for sealing containers such as bottles, jars and the like with a two-piece liner and tabbed sealing member.

BRIEF DESCRIPTION OF THE DRAWINGS

FIG. 7 is a cross-sectional view of an exemplary two-piece liner and pull-tab seal assembly;

FIG. 8 is an exploded, partial cut-away view showing a closure cap with a liner retained therein and removed from a tabbed seal portion adhered to a mouth of a container;

DETAILED DESCRIPTION

Figure 3:
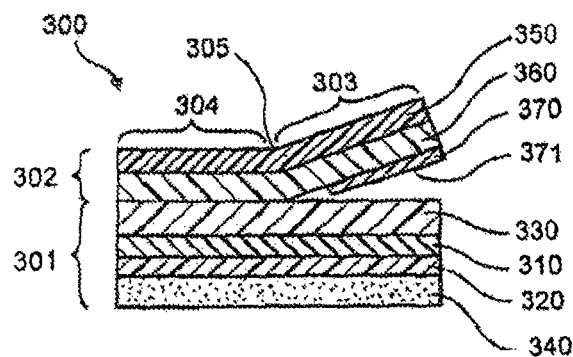
FIG. 3 is a side cross sectional view of a seal.

A pull-tab sealing member (i.e., closure) for a container is shown generally in FIG. 3 as seal 300. The relative thicknesses of the layers shown in FIG. 3 are not to scale, for purposes of illustration. Furthermore, the construction shown is provided for purposes of illustration only, and is not intended to be construed in a limiting sense.

Seal 300 is constructed from a bottom laminate sheet 301 and a top laminate sheet 302. Bottom sheet 301 includes a metal foil, support layer 310 having a lower polymer layer 320 on the underside thereof and a non-foam, heat-distributing layer 330 on the top surface thereof. Metal foil support layer 310 is preferably aluminum foil although other metals can easily be substituted. Support layer 310 is advantageously about 0.0005 to 0.0020 inches thick.

Lower polymer layer 320 is advantageously formed of polyethylene terephthalate (PET), preferably to a thickness ranging from about 0.0004 to 0.0015 inches. Other suitable materials include nylon, PEN and polypropylene. The bottom surface of lower sheet 301 is advantageously coated with a heat-activated sealant or adhesive 340. The type of adhesive is based in part on the characteristics of the container. Suitable heat-activated adhesives (as used herein, the term sealant will include heat-activated adhesives suitable for adhering a container seal to a container) include, but are not limited to, ethylene vinyl acetate, ethylene-acrylic acid copolymers, surlyn and other materials known in the industry.

The top surface of bottom sheet 301 (layer 330) is advantageously provided with a non-foam, heat-distributing layer 330. Layer 330 is formed of any non-foam, polymeric material that exhibits insulative properties as well as resistance to tearing or rupturing upon removal of the closure from the sealed container. In a preferred embodiment, the non-foam, heat-distributing layer 330 is a polyolefin film layer. The polyolefin film layer can be a monolayer or a bilayer of two olefin resins co-extruded with a tie layer. Examples of polyolefin resins to be used, include but are not limited to, polyethylene, polypropylene, ethylene-propylene copolymers, blends thereof as wells as copolymers or blends with higher α-olefins. The thickness of the polyolefin film layer is preferably at least about 0.0025 inches (2.5 mil), with at least 0.0030 inches (3 mil) being more preferred and at least 0.0035 inches (3.5 mil) being even more preferred. However, the actual thickness needed to effect even heat distribution and tear resistance is dependent on the type of polyolefin resin used. As will be apparent to one skilled in the art, polymeric properties such as density and melt index are variable and will affect the insulative and tear resistance properties of the material. In one preferred embodiment, the polyolefin resin to be used as the film layer has a density of at least about 0.96 grams/centimeter$^3$ (g/cm$^3$), with 0.97 g/cm$^3$ being more preferred, and 0.98 g/cm$^3$ being even more preferred. Overall, the thickness of the polyolefin film layer should also preferably be no thicker than about 0.010 inches, with no more than 0.008 inches being more preferred. Thicknesses greater than these parameters generally increase the bulkiness of the sealing member, provide minimal additional benefit, and are not cost-effective.

Top laminate sheet 302 is advantageously formed with a polymer support 350, advantageously including a polymer layer 360 on a bottom surface thereof. Support 350 is preferably formed from a strong heat resistant sheet-like material, which can maintain its strength at small thicknesses and which has high pull strength. A preferred material is PET and other suitable materials include PEN and nylon. Polymer layer 360 is advantageously formed of EVA and is advantageously from 0.001 to 0.003 inches thick. EVA is preferred because of its thermal bonding characteristics, such that it readily bonds to layer 330. If layer 360 is too thick, it becomes difficult to achieve satisfactory bonds. If it is too thin, bond strength can be inadequate. Other suitable materials include low density polyethylene, ethylene-acrylic acid copolymers and ethylene methacrylate copolymers.

Top sheet 302 also includes a tab portion 303. Tab portion 303 is not adhered to bottom sheet 301 and can be folded up and away from bottom sheet 301 to provide a gripping tab for removing seal 300 from the top of the container. Top sheet 302 also includes a joining portion 304 which is adhered to bottom sheet 301. A boundary 305 exists at the interface between tab portion 303 and joining portion 304. Boundary 305 advantageously extends in a straight line from edge to edge of seal 300. Boundary 305 is advantageously at or near the middle of seal 300.

The underside of tab 303 advantageously includes a release strip (tabbing strip) 370, preferably having a coat of release material 371 on the underside thereof. Release strip 370 and release coat 371 help prevent tab portions 303 from adhering to the top of bottom sheet 301. Release strip 370 is preferably formed of PET, such as white PET and advantageously includes written material, pictures other information thereon. Other suitable materials include nylon and polypropylene. Release layer 370 is advantageously 0.00045 to 0.0010 inches thick and preferably occupies the entire underside of tab portion 303, substantially up to boundary 305. Suitable materials for release coat 371 include various known heat resistant coatings preferably silicone release coatings.

Bottom sheet 301 is formed by adhering polymer layer 320 to support layer 310 with an adhesive. Polymeric heat-distributing layer 330 can also be adhered to support layer 310 with adhesive. Suitable adhesives include ethylene acrylic acid copolymers, curable two part urethane adhesives and epoxy adhesives. A preferred adhesive is Morton Adcote 522 or Novacote 250. As used herein, the term adhesive will include curable adhesives, heat activated adhesives and thermoplastic adhesives. Top support layer 350 can also be adhered to polymer layer 360 with adhesive.

Figure 6:
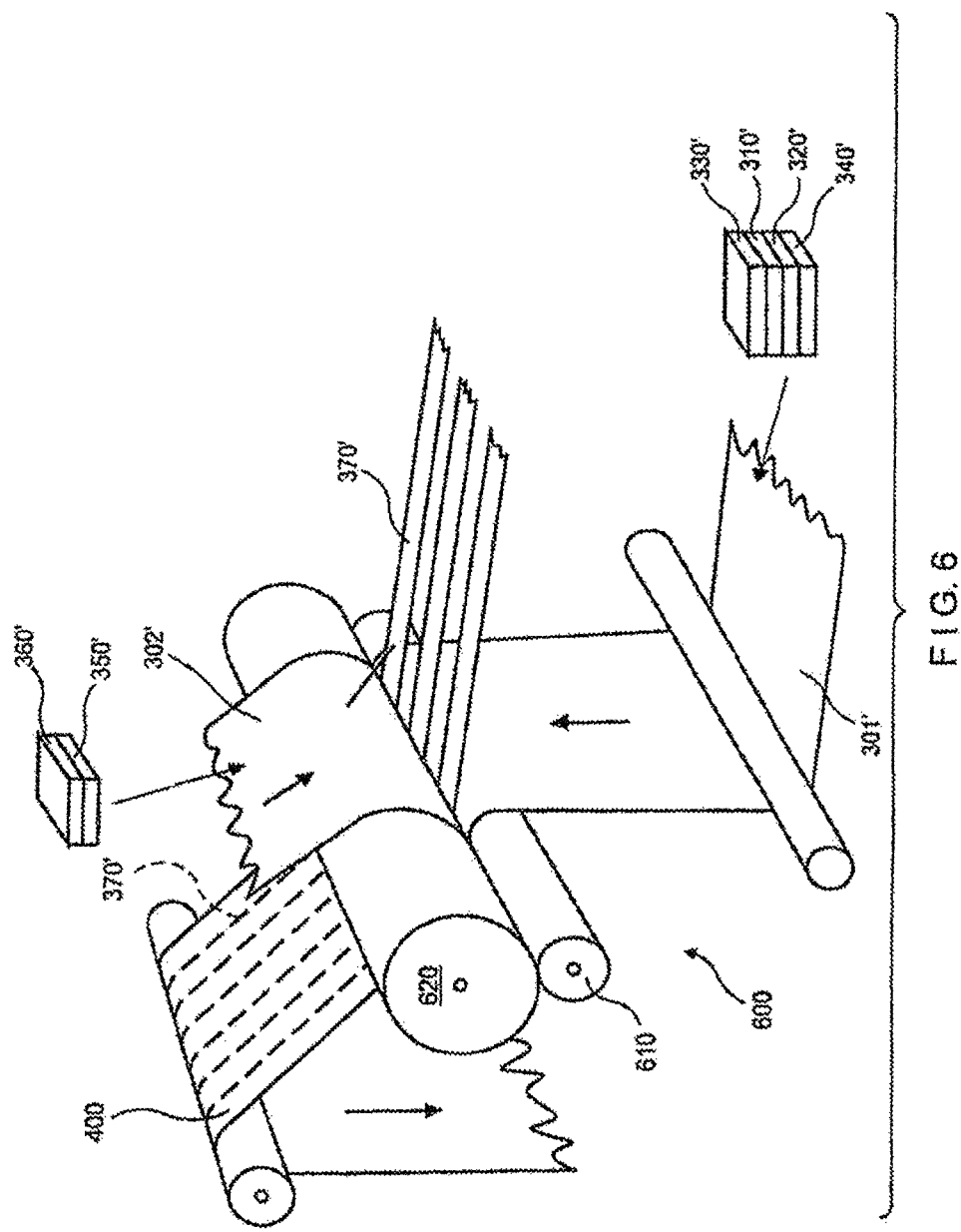
FIG. 6 is a demonstrative perspective view of an apparatus constructing sheets for forming container seals.

An apparatus for forming a laminated sheet from which seals can be obtained is shown generally as apparatus 600 in FIG. 6.

A bottom sheet 301' including a support layer 310' with a top layer of polymeric heat-distributing layer 330' and a bottom polymer coat 320', having sealant 340' on the bottom thereof is fed to the nip where a pressure roll 610 meets a hot roll 620. A top sheet 302' is also fed into the nip between pressure roll 610 and hot roll 620. Top sheet 302' includes a support film 350' and a polymer layer 360' on support film 350. Top sheet 302' is fed into the nip between rolls 610 and 620 so that polymer layer 360' faces non-foam, heat-distributing layer 330'. Release strips (tabbing strips) 370' are combined with and inserted between top sheet 302' and bottom sheet 301' in a parallel spaced arrangement. After heat from hot roll 620 joins top sheet 302', release strips 370' and bottom sheet 301', a laminate sheet 400 results.

Figure 4:
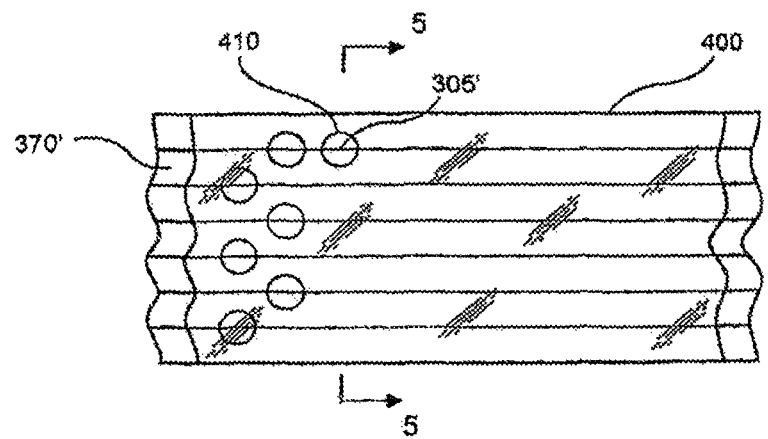
FIG. 4 is a top plan view of a sheet used to form seals.
Figure 5:
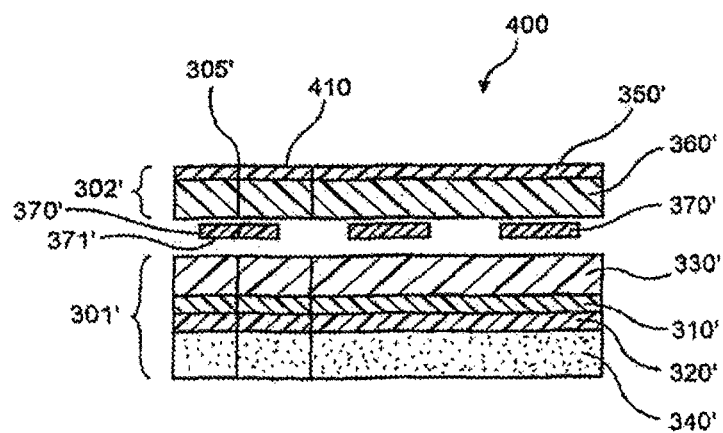
FIG. 5 is a cross-sectional view of the sheet of FIG. 4 taken along line 5-5.

Laminate sheet 400 is shown in plan view in FIG. 4 and in cross section in FIG. 5. The relative size of the layers are not shown to scale and top sheet 302' bottom sheet 301' and tabbing strips 370' are not shown in a fully laminated joined structure. Also, adhesive between the layers has not been shown. However, those of ordinary skill in the art would understand how to adhere these multiple layers. To form pull-tab sealing members, circular (or other appropriately shaped) portions 410 are die cut from sheet 400. As can be see in FIG. 4, a boundary 305' is established at the edge of each release strip 370'. Because the bottom of release strip 370' does not adhere to the top surface of non-foam heat-distributing layer 330', a tab portion will extend from non-foam heat-distributing layer 330' for gripping.

Figure 1:
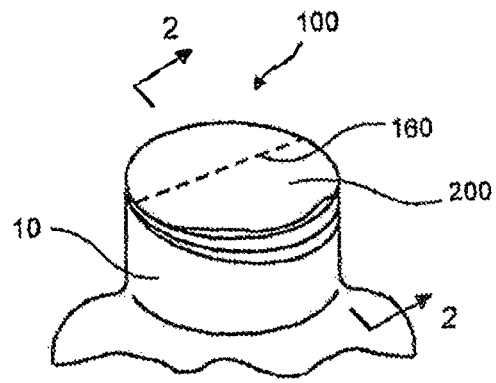
FIG. 1 is a perspective view of a conventional closure disposed over the mouth of a bottle.
Figure 2:
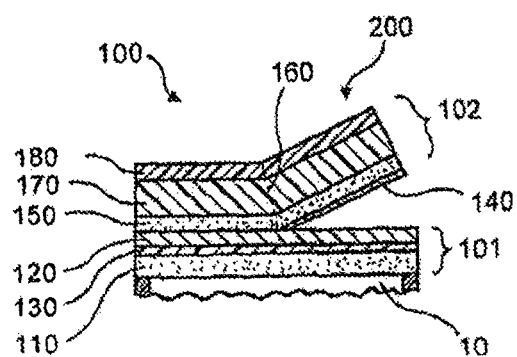
FIG. 2 is a cross-sectional view of the closure of FIG. 1 taken along line 2-2.

While not wishing to be limited by theory, it is believed that the advantages offered by the pull-tab sealing members herein are achieved by disposing non-foam, heat-distributing layer 330 on the side of metal foil layer 310 opposite from sealant or adhesive layer 340 as illustrated in FIG. 3. The placement of non-foam, heat-distributing layer 330 redirects heat from induction heating of the metal foil evenly towards layer 340. The redistribution of heat results in adhesive or sealant being equally activated on both the tabbed and non-tabbed sides of the pull-tab sealing members. To the contrary, prior art pull-tab seals as illustrated in FIG. 2 allow heat from the metal foil to escape upwards and away from layer 340 in an uneven manner. The uneven release of heat in the prior art seals is believed due to the different heat transfer characteristics exhibited by the tabbed and non-tabbed sides of the seal. This in turn results in the uneven activation of the adhesive or sealant that causes the uneven sealing exhibited by prior art pull-tab seals as illustrated by FIG. 2.

The pull-tab sealing members described herein are sealed to the tops of containers using a heat activated adhesive. The adhesive is heated through induction heating of the metal foil support in the bottom sheet of the seal, such as an aluminum foil support sheet. Tabs formed in accordance with the disclosure herein, in which the tabbing strip is formed of PET and the non-foam, heat-distributing layer is included on the foil layer at the interface with the top layer, exhibits substantially more even heating and improved sealing.

Moreover, pull-tab sealing members herein will bond to the top surface of containers, without the need to oversize the seal and have portions of the seal extend beyond the top edge of the container, providing a neater appearance. The pull-tab sealing members also provide adequate sealing even when the top surface of the container was not substantially smooth, such as in the case of containers having mold lines or other imperfections on the top surface thereof. The pull-tab sealing members also exhibit substantially improved water resistance compared to container seals in which paper is exposed or in which a metal foil surface is either exposed or covered with only paper. Thus, the pull-tab sealing members offer the additional advantage of reduced corrosion from exposure to water or juices. An additional benefit of the pull-tab sealing members is that the non-foam heat-distributing layer isolates and thereby inhibits deterioration to the tab portion of the seal when the sealant is heat-activated to adhere the sealing member to a container.

Turning to FIGS. 7 and 8, exemplary two-piece liner and tabbed sealing member assemblies are illustrated using the non-foam heat distributing polyolefin layer described above. In one approach shown in FIG. 7, a two-piece assembly 400 includes an upper liner 412 releasably bonded to a lower pull-tabbed sealing member or seal portion 410. Upon induction heating, the upper liner 412 separates from the lower pull-tabbed sealing member 410 so that the liner 412 may be retained in a cap or other closure 490 (such as a screw cap) and the pull-tabbed sealing member 410 is adhered to a rim 492 surrounding an opening of a container 494 (generally shown in FIG. 8). FIG. 8 shows the cap in a partial cut-away view so that the liner 412 retained therein is visible. The liner 412 may be retained by threading, protruding members, or other retention devices on an inner surface of the closure 490.

As described further below, assembly 400 includes a non-foam heat distributing layer, such as the non-foam heat distributing polyolefin layer described above. In one approach the non-foam heat distributing layer has a density and a thickness effective so that the upper liner portion 412 can be separated or otherwise released from the lower pull-tab portion 410 during induction heating and so that the lower pull-tab portion 410 forms a bond to a container rim that is effective to allow the entire pull-tab portion 410 to be removed from a container without tearing, rupturing, or delaminating of the tab portion from the remainder of the laminate upon a user applying a pulling or removal force to the tab.

More specifically, one approach of a two piece liner includes the tabbed seal portion 410 having a lower seal laminate 401 and an upper tabbed portion 402. The lower seal laminate 401 includes, starting at the bottom most layer, a sealant layer 440 for bonding to the rim of a container. By one approach, the sealant layer 440 may be a heat-activated sealant or adhesive. Suitable heat-activated materials may be a mono-layer or a co-extruded layer of ethylene vinyl acetate, ethylene-acrylic acid copolymers, surlyn, and the like as well as blends thereof that is about 0.5 to about 3 microns thick and configured to be heat sealed to a container rim upon application of induction heating. By one approach, the sealant layer may be a co-extruded polyethylene with about 9 to about 20 percent EVA. Sealant layer 440 may also be other adhesives or bonding layers as needed for a particular application.

Next, a polymer film layer 420 is bonded to an upper surface of the sealant layer 440. By one approach, layer 420 is bonded to layer 440 by an adhesive, such as a two-component polyurethane adhesive. By one approach, the adhesive may be coated thereon at a basis weight of about 3 to about 5 grams/m². Layer 420 may be a 48 to 92 gauge polyester film layer, or layer 420 may be nylon, PEN, and/or polypropylene.

Above layer 420, there is a membrane or induction heating layer 410. By one approach, layer 410 is aluminum, such as about a 5 to about a 25 micron thick aluminum foil layer, but other metals, foils, and materials may also be used that have a high thermal conductivity. By one approach, layer 410 is bonded to layer 420 by an adhesive, such as a two-component polyurethane adhesive. By one approach, the adhesive may be coated thereon at a basis weight of about 3 to about 5 grams/m².

Above the membrane layer 410, there is a non-foam heat distributing layer 430, such as a non-foam heat distributing polyolefin film layer as described in the previous embodiments. By one approach, the non-foam heat distributing polyolefin film layer is a blend of polyolefin materials, such as a blend of one or more high density polyolefin components combined with one or more lower density polyolefin components. Suitable polymers include but are not limited to, polyethylene, polypropylene, ethylene-propylene copolymers, blends thereof as well as copolymers or blends with higher alpha-olefins. By one approach, the non-foam heat distributing polyolefin film layer is a blend of about 50 to about 70 percent of one or more high density polyolefin materials with the remainder being one or more lower density polyolefin materials. The blend is selected to achieve effective densities to provide both heat sealing to the container as well as separation of the liner from the seal.

By one approach, effective densities to achieve both separation of the liner and acceptable sealing of the tabbed seal to a container are similar to those of the previous embodiments and include densities of the non-foam heat distributing polyolefin layer between about 0.96 g/cc to about 0.99 g/cc. Above or below this density range, unacceptable results are obtained because the layer provides too much insulation or does not effectively distribute heat. By another approach, the non-foam heat distributing layer is a blend of about 50 to about 70 percent high density polyethylene combined with low to medium density polyethylene effective to achieve the density ranges described above.

In addition, effective thicknesses of the non-foam heat distributing layer are selected to achieve such performance in combination with the density. One approach of an effective thickness may be about 2 to about 10 mils. Thicknesses outside this range were unacceptable because the layer does not provide enough insulation or does not effectively distribute heat as needed to achieve the dual performance characteristics of liner separation and seal member bonding.

Above the non-foam heat distributing layer 430, there is a partial layer, tabstock, or tab defining layer 470. The tabstock 470 is not bonded to the non-foam heat distributing layer 430 below it in order to form a tab that is defined wholly within the circumference or perimeter of the lower seal member similar to the embodiments discussed above. By one approach, the tabstock 470 is a polyester, such as PET. Optionally, the tabstock 470 may include a release coating 471 on a lower surface thereof.

Next, a bonding layer 460 covers and is bonded to both the tabstock 470 and the non-foam heat distributing layer 430. The bonding layer 460 combined with the tabstock 470 forms a tab that can be pivoted upwardly similar to the discussion on the previous one-piece assemblies mentioned above. By one approach, the bonding layer may be about 2 to about 3 mils of ethylene vinyl acetate (EVA) or other acceptable bonding materials. Another suitable bonding layer may be ethyl methacrylate (EMA).

Above the bonding layer 460 is an upper protective layer 450, such as a layer of 48 to 142 gauge polyester. PET is one acceptable polyester. Optionally, above the protective layer 450, there may also be an additional support layer 451, such as another layer of polyester. A layer of 48 to 92 gauge PET may be suitable for the support layer 451. The use of the optional support layer 451 may aid in providing a reinforced pull-tab layer that does not fold over during assembly and is more durable to withstand heating so that the upper layers of the pull-tab do not melt and back bond to the liner. To this end, densities of the protective layer and the support layer may greater than the non-foam heat distributing layer discussed above. By one approach, densities of layers 450 and 451 may be at least about 1 g/cc and, in some cases, about 1 to about 1.4 g/cc. For instance, with the use of the optional support layer 451, a support is provided above the foil over the entire circumference or surface area of the liner that aids in preventing or reducing fold over or distortion of the liner when it is inserted into a cap or other closure. By one approach, layer 450 is bonded to layer 451 by an adhesive, such as a two-component polyurethane adhesive. By one approach, the adhesive may be coated thereon at a basis weight of about 3 to about 5 grams/m². Layers 450 (and 451 if used) through layer 440 as shown in FIG. 7 form the lower tabbed portion 410 in this example. Layer 451 helps increase the tear resistance of the seal, helps minimize fold over, and increases the stiffness. A 142 gauge layer 450 may also be used to achieve such functionality.

Forming the second piece of the two-piece assembly is a liner portion 412 that is releasably bonded to an upper surface of the lower pull-tabbed portion 410. This liner portion includes a releasable bonding layer 480 that releasably bonds a liner layer 482 to an upper surface 481 of the lower pull-tab sealing member 410. By one approach, the releasable bonding layer 480 is a wax layer or a dot matrix of wax that bonds the liner to the pull-tab sealing member, but allows these layers to separate upon heating. However, the releasable bonding layer 480 may be other materials that form a temporary bond between the two adjacent portions. The liner 482 may be a fiber, pulp, cardboard, synthetic polymer, foam, or other compressing type layer. By one approach, the liner may be 10-40 mils thick.

In one approach, upon induction heating, the non-foam heat distributing layer 430 has a density and a thickness effective to redistribute sufficient heat so that the layer 480 releases or melts substantially across the entire upper surface area of the tabbed seal 410 (including both the tabbed and non-tabbed sides of the seal) to a molten state and then is absorbed by the pulp backing liner 742. At the same time, the non-foam heat distributing layer also has a density and thickness to provide sufficient thermal energy to form a desired bond to the container rim. In this case, the heat seal bond to a container is such that the lower pull-tab sealing member 410 can be removed from the container in one piece, without tearing, rupturing, or delaminating of the tab upon a user applying a pulling or removal force to the tab similar to the prior embodiments. That is, the non-foam heat distributing polyolefin layer 430 is effective to provide the dual performance of both a more uniform heat distribution above and below the layer 430 so that the seal 410 is properly bonded to the container and the wax 480 is effectively melted across the entire surface areas of the seal to adequately separate the liner from the seal over a wide induction sealing window. By one approach, the wide induction sealing widow encompasses induction heating dwell times of about 1.2 to about 2.5 seconds, which is about a 60 percent larger induction sealing window that prior two-piece tabbed members.

Advantages and embodiments of the seals and assemblies herein are further illustrated by the following examples; however, the particular conditions, processing schemes, materials, and amounts thereof recited in these examples, as well as other conditions and details, should not be construed to unduly limit the seals and assemblies described herein. All percentages are by weight unless otherwise indicated.

EXAMPLES

Example 1

A 0.7 mil aluminum foil sheet was adhered to a 0.5 mil PET film with adhesive. A 1.5 mil sealant film was then adhesive laminated to the PET surface of the foil/PET laminate. The three ply laminate was then adhered to a 3 mil polyolefin film layer with urethane adhesive to form a bottom sheet. The olefin film layer was a commercially available resin blend sold under the trade name Imaflex® HD Double White PE, which is a monolayer polyethylene film blend of high density and medium density PE with a 70% by weight high density component. The olefin film was pigmented. The overall density of the film was 0.978 g/cm$^3$. The top sheet was adhered to the bottom sheet with a thermal bonding process after 0.5 mil PET tabbing strips were inserted therebetween. The bottom side of the tabbing strips was coated with a silicone release coating to insure that they did not adhere to the olefin film top layer of the bottom sheet. Circular seals, approximately 1.5 inches in diameter, were die cut from the strips, with the edge of the tabbing sheet extending approximately down the midpoint of the circle, to yield tabs having a base running down the middle of the seals, from edge to edge. The sealing members were induction sealed to containers and produced an even seal.

Example 2

Following the procedure of Example 1, a 0.7 mil aluminum foil sheet was adhered to a 0.5 mil PET film with adhesive. A 1.5 mil sealant film was then adhesive laminated to the PET surface of the foil/PET laminate. The three ply laminate was then adhered to a 3 mil polyolefin film layer, NEX M4129, with urethane adhesive to form a bottom sheet. The NEX (New England Extrusion) M4129 grade film was a monolayer film with a 50% by weight high density component blended with low density polyethylene and a fractional melt index polyethylene. The overall film density was 0.994 g/cm$^3$. The olefin film was pigmented. The top sheet was adhered to the bottom sheet with a thermal bonding process after 0.5 mil PET tabbing strips were inserted therebetween. The bottom side of the tabbing strips was coated with a silicone release coating to insure that they did not adhere to the olefin film top layer of the bottom sheet. Circular seals, approximately 1.5 inches in diameter, were die cut from the strips, with the edge of the tabbing sheet extending approximately down the midpoint of the circle, to yield tabs having a base running down the middle of the seals, from edge to edge. The sealing members were induction sealed to containers and produced an even seal.

Example 3

Following the procedure of Example 1, a 0.7 mil aluminum foil sheet was adhered to a 0.5 mil PET film with adhesive. A 1.5 mil sealant film was then adhesive laminated to the PET surface of the foil/PET laminate. The three ply laminate was then adhered to a co-extruded 3 mil polyolefin film layer, NEX C4349WH, with urethane adhesive to form a bottom sheet. The NEX C4349WH grade film was a co-extruded bilayer of polyethylene/polypropylene resins blended with a plastomer polyolefin for toughness. The overall film density was 0.989 g/cm$^3$. The olefin film was pigmented. The top sheet was adhered to the bottom sheet with a thermal bonding process after 0.5 mil PET tabbing strips were inserted therebetween. The bottom side of the tabbing strips was coated with a silicone release coating to insure that they did not adhere to the olefin film top layer of the bottom sheet. Circular seals, approximately 1.5 inches in diameter, were die cut from the strips, with the edge of the tabbing sheet extending approximately down the midpoint of the circle, to yield tabs having a base running down the middle of the seals, from edge to edge. The sealing members were induction sealed to containers and produced an even seal.

Example 4

Figure 9:
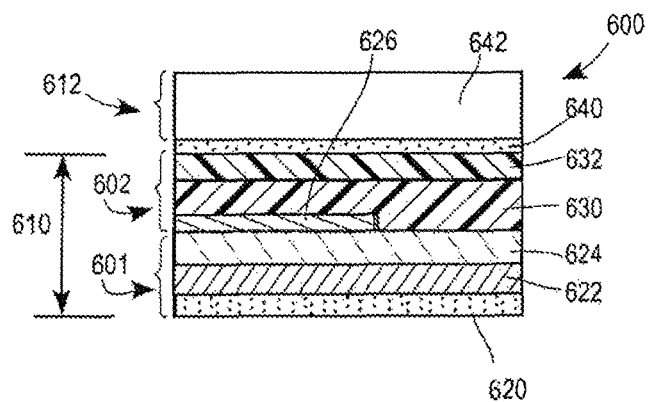
FIG. 9 is a cross-sectional view of a comparative two-piece liner and seal assembly evaluated in Example 4.

A comparison was performed showing the induction sealing window achievable using a comparative, conventional top-tabbed two-piece liner to a two-piece liner and seal assembly using the non-foamed heat distribution layer described herein. The testing used an Enercon Compak Jr.

induction cap sealer (Menomonee Falls, Wis.). The liner and seal assemblies used in the evaluation are shown in FIG. 9 (comparative) and FIG. 10 (non-foam heat distributing layer). Each assembly was induction sealed to a 38 mm HDPE bottle (100 cc) with a screw top closure and evaluated over a range of dwell times from about 1.2 seconds to about 2.6 seconds.

FIG. 9 shows the comparative liner and seal assembly 600 that does not include the non-foam heat distributing layer. This comparative assembly includes an upper liner portion 612 bonded to a lower seal portion 610. It will be appreciated that the assembly is not drawn to scale. In the tabbed seal portion 610, there is a lower seal laminate 601 and an upper tabbed portion 602. The lower seal laminate 601 includes, from top to bottom, a 1.5 mill co-extruded polyethylene and EVA sealant layer 620 with about 12 percent EVA (New England Extrusion). A 48 gauge polyester film layer 622 is bonded to the sealant layer 620 with about 3.5 grams/m$^2$ of a two-component polyurethane adhesive (COIM USA). Above layer 622, there is a layer of 25 micron thick aluminum foil 624 bonded to layer 622 with the two-component polyurethane adhesive (3.5 grams/m$^2$). Above the foil layer 624, there is a partial layer or paper tab layer 626. This paper layer 626 is not bonded to the foil 624. Then, a layer of 3 mil thick ethylene vinyl acetate (EVA) 630 covers and is bonded to both the paper layer 626 and the foil layer 624. Above the EVA 630 is a layer of 92 gauge PET 632. Layers 620 through layer 632 form the lower tabbed portion 610. Wax bonded to the tabbed portion 610 is the upper liner portion 612. This portion includes about 12.5 grams/m$^2$ of a wax layer 640 that releasably bonds a pulp backing liner 642 to the tabbed seal 610. Upon induction heating the wax is supposed to melt across the entire upper surface area of the tabbed seal 610 to a molten state and then be absorbed by the pulp backing liner 642. However, due to the paper layer 626, heat does not properly flow through the laminate to evenly melt the wax across the entire surface area of the assembly.

Figure 10:
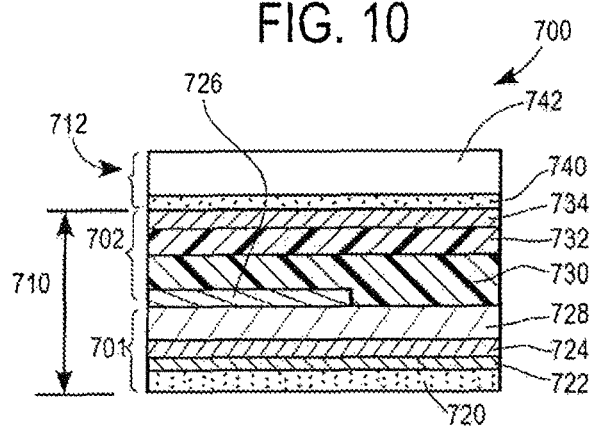
FIG. 10 is a cross-sectional view of another exemplary two-piece liner and pull-tab seal assembly evaluated in Example 4.

FIG. 10 shows a liner and seal assembly 700 using the non-foam heat-distributing polyolefin film layer as described and used for the evaluation in this Example. This assembly includes an upper liner portion 712 bonded to a lower seal portion 710. It will also be appreciated that the assembly is not drawn to scale. In the tabbed seal portion 710, there is a lower seal laminate 701 and an upper tabbed portion 702. The lower seal laminate 701 includes, from top to bottom, a 1.5 mil co-extruded polyethylene and EVA sealant layer 720 with about 12 percent EVA (New England Extrusion). A 48 gauge polyester film layer 722 bonded to the sealant layer 720 with about 3.5 grams/m$^2$ of a two-component polyurethane adhesive (COIM USA). Above layer 722, there is a layer of 25 micron thick aluminum foil 724 bonded to layer 722 with the two-component polyurethane adhesive (3.5 grams/m$^2$). Above the foil layer 624, there is a non-foam heat-distributing layer of a 2.5 mil polyolefin film 728. Film 728 was a monolayer polyethylene film with about 70 percent high density polyethylene and an overall density of 0.978 g/cm$^3$. (Imaflex Double White PE.) Above the non-foam heat-distributing layer 728, there was a partial layer or PET tabstock or tab defining layer 726. The tabstock 726 was not bonded to the non-foam heat-distributing layer 728. Then, a layer of 2 mil thick ethylene vinyl acetate (EVA) 730 covers and is bonded to both the tabstock 726 and the non-foam heat-distributing layer 728. Above the EVA 730 is a layer of 92 gauge PET 732. About the PET layer 732 there is an additional layer of polyester in the form of a 48 gauge polyester film 734 bonded to layer 732 with about 3.5 grams/m$^2$ of the two-component polyurethane adhesive. Layers 720 through layer 734 form the lower tabbed portion 710. Wax bonded to the tabbed portion 710 is the upper liner portion 712. This portion includes about 12.5 grams/m$^2$ of a wax layer 740 that releasably bonds a pulp backing liner 742 to the tabbed seal 710.

Upon induction heating the wax melts across the entire upper surface area of the tabbed seal 710 to a molten state and then is absorbed by the pulp backing liner 742. In this case, due to the non-foam heat-distributing layer 728, a more uniform heat transfer was experienced both above the below the layer 728 and the seal 700 properly bonded to the container and the wax was effectively melted across the entire surface areas of the seal to separate the liner from the seal over a much wider induction heating window that the comparative liner as shown in Table 1 below.

The results of the evaluation are provided in Table 1 below. The Table identified seal performance as either acceptable (A) or a failure. Failures were observed and identified in the Table as tab pull off where the tab separated from the lower liner portion because the heat seal was bonded to strongly to the container rim (T), squeeze out of polymer (S), back bonding of the seal to liner due to melting of upper seal layer (BB), or base facing layer tearing upon tab pulling due to excessive bonding of the heat seal layer to the container (BT).

As seen in Table 1, the comparative liner and seal assembly without the non-foam heat distributing layer had a very narrow sealing window and provided acceptable performance with a heat seal dwell time window of only about 1.2 seconds to about 1.5 seconds. On the other hand, the liner and seal assembly constructed according to the disclosure herein with the non-foam heat-distributing layer dramatically increased the operating window of the induction sealing dwell times to about 1.2 second all the way up to 2.5 seconds.

TABLE 1

Induction Sealing Performance Results

| Assembly | Dwell Time, Seconds | | | | | | | | | | | | | | |
|---|---|---|---|---|---|---|---|---|---|---|---|---|---|---|---|
| | 1.2 | 1.3 | 1.4 | 1.5 | 1.6 | 1.7 | 1.8 | 1.9 | 2 | 2.1 | 2.2 | 2.3 | 2.4 | 2.5 | 2.6 |
| | Observed Seal Performance | | | | | | | | | | | | | | |
| Comparative 2-Piece liner and seal without non-foam heat-distributing layer | A | A | A | A | BT | BT | BT | BT | BT | BT | BT | BT, S, T | BT | BT, BB | BT, BB |

TABLE 1-continued

Induction Sealing Performance Results

| | Dwell Time, Seconds | | | | | | | | | | | | | | |
|---|---|---|---|---|---|---|---|---|---|---|---|---|---|---|---|
| | 1.2 | 1.3 | 1.4 | 1.5 | 1.6 | 1.7 | 1.8 | 1.9 | 2 | 2.1 | 2.2 | 2.3 | 2.4 | 2.5 | 2.6 |
| Assembly | Observed Seal Performance | | | | | | | | | | | | | | |
| 2-piece liner and seal using non foam heat-distributing layer | A | A | A | A | A | A | A | A | A | A | A | A | A | A | T |

It will be understood that various changes in the details, materials, and arrangements of the process, liner, seal, and combinations thereof, which have been herein described and illustrated in order to explain the nature of the products and methods may be made by those skilled in the art within the principle and scope of the embodied product as expressed in the appended claims.

What is claimed is:

1. A laminate sheet configured to form a tabbed sealing member with improved heat distribution for sealing to a rim surrounding a container opening, the laminate sheet comprising:
   a bottom laminate sheet including a lower sealant or adhesive coating for securing a formed tabbed sealing member to a container rim, a metal foil layer above the lower sealant or adhesive coating for heating the lower sealant or adhesive coating in a formed tabbed sealing member, and a non-foam, heat-distributing polyolefin film layer above the metal foil layer;
   the non-foam, heat-distributing polyolefin film layer including at least a high density polyolefin component and having a density from about 0.96 to about 0.99 g/cc;
   an upper laminate sheet including a first portion secured to the non-foam, heat distributing polyolefin film layer and a second portion not secured to the non-foam, heat distributing polyolefin film layer so that a when a tabbed sealing member is formed out of the laminate sheet a pull tab is defined by part of the upper laminate sheet second portion;
   a release strip between the upper laminate sheet and the bottom laminate sheet, the release strip secured to the upper laminate sheet but not secured to the bottom laminate sheet to form the upper laminate sheet second portion; and
   the non-foam, heat distributing polyolefin film layer is a sufficient thickness so that when the lower sealant or adhesive coating of a formed tabbed sealing member is secured to a container, a formed tabbed sealing member can be removed from the container by the pull tab without separating the upper laminate sheet from the bottom laminate sheet or rupturing the non-foam, heat-distributing polyolefin film layer.

2. The laminate sheet of claim 1, wherein the non-foam, heat-distributing polyolefin film layer is selected from the group consisting of polyethylene, polypropylene, ethylene-propylene copolymers, and blends thereof.

3. The laminate sheet of claim 1, wherein the non-foam, heat distributing polyolefin film layer is at least about 2 mils thick.

4. The laminate sheet of claim 1, wherein the release strip is PET.

5. The laminate sheet of claim 1, wherein the upper laminate sheet includes a polymer support layer and a layer of EVA under the polymer support layer.

6. The laminate sheet of claim 5, wherein the layer of EVA secures the upper laminate sheet to the bottom laminate sheet at the upper laminate sheet first portion.

7. The laminate sheet of claim 6, wherein the polymer support layer is selected from PET, nylon, PEN, and blends thereof.

8. The laminate sheet of claim 1, wherein the non-foam, heat-distributing polyolefin film layer has a density of at least about 0.97 g/cc.

9. The laminate sheet of claim 1, wherein the non-foam, heat distributing polyolefin film layer is from about 2.5 to about 10 mils thick.

10. The laminate sheet of claim 1, wherein the non-foam, heat distributing polyolefin film layer is a bilayer of polyolefins.

11. A tabbed sealing member including a non-foam, heat-distributing polyolefin film layer for sealing to a rim surrounding a container opening, the tabbed sealing member comprising:
   a bottom laminate sheet including a lower sealant or adhesive coating for securing the tabbed sealing member to a container rim, a metal foil layer above the lower sealant or adhesive coating, and a non-foam, heat-distributing polyolefin film layer above the metal foil layer;
   the non-foam, heat-distributing polyolefin film layer including at least a high density polyolefin component and having a density from about 0.96 to about 0.99 g/cc;
   an upper laminate sheet including a first portion secured to the non-foam, heat distributing polyolefin film layer and a second portion not secured to the non-foam, heat distributing polyolefin film layer to form a pull tab; and
   the non-foam, heat distributing polyolefin film layer is a sufficient thickness so that when the lower sealant or adhesive coating is secured to a container, the tabbed sealing member can be removed from the container by the pull tab without separating the upper laminate sheet from the bottom laminate sheet or rupturing the non-foam heat-distributing polyolefin film layer.

12. The tabbed sealing member of claim 11, wherein the non-foam, heat-distributing polyolefin film layer is selected from the group consisting of polyethylene, polypropylene, ethylene-propylene copolymers, and blends thereof.

13. The tabbed sealing member of claim 11, wherein the non-foam, heat distributing polyolefin film layer is at least about 2 mils thick.

14. The tabbed sealing member of claim 11, further comprising a release strip between the upper laminate sheet and the bottom laminate sheet, the release strip secured to the upper laminate sheet but not secured to the bottom laminate sheet to form the upper laminate sheet second portion.

15. The tabbed sealing member of claim 11, wherein the upper laminate sheet includes a polymer support layer and a layer of EVA under the polymer support layer.

16. The tabbed sealing member of claim 15, wherein the layer of EVA secures the upper laminate sheet to the bottom laminate sheet at the upper laminate sheet first portion.

17. The tabbed sealing member of claim 16, wherein the polymer support layer is selected from PET, nylon, PEN, and blends thereof.

18. The tabbed sealing member of claim 11, wherein the non-foam, heat-distributing polyolefin film layer has a density of at least about 0.97 g/cc.

19. The tabbed sealing member of claim 11, wherein the non-foam, heat distributing polyolefin film layer is from about 2.5 to about 10 mils thick.

20. The tabbed sealing member of claim 11, wherein the non-foam, heat distributing polyolefin film layer is a bilayer of polyolefins.

\* \* \* \* \*